US012536387B2

(12) United States Patent
Sobhy Deraz

(10) Patent No.: US 12,536,387 B2
(45) Date of Patent: Jan. 27, 2026

(54) TASK DECOMPOSITION FOR LLM INTEGRATIONS WITH SPREADSHEET ENVIRONMENTS

(71) Applicant: Microsoft Technology Licensing, LLC, Redmond, WA (US)

(72) Inventor: Ehab Sobhy Deraz, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 252 days.

(21) Appl. No.: 18/309,108

(22) Filed: Apr. 28, 2023

(65) Prior Publication Data
US 2024/0303441 A1 Sep. 12, 2024

Related U.S. Application Data

(60) Provisional application No. 63/489,721, filed on Mar. 10, 2023.

(51) Int. Cl.
*G06F 40/40* (2020.01)
*G06F 40/18* (2020.01)
*G06T 11/20* (2006.01)

(52) U.S. Cl.
CPC ............. *G06F 40/40* (2020.01); *G06F 40/18* (2020.01); *G06T 11/206* (2013.01)

(58) Field of Classification Search
CPC .......... G06F 40/40; G06F 40/18; G06F 40/30
See application file for complete search history.

(56) References Cited

U.S. PATENT DOCUMENTS

| 11,861,263 | B1 * | 1/2024 | Hunt | G06F 3/0481 |
| 2009/0089653 | A1 * | 4/2009 | Campbell | G06F 40/18 715/209 |
| 2015/0019216 | A1 * | 1/2015 | Singh | G06F 16/24578 704/235 |
| 2016/0196820 | A1 * | 7/2016 | Williams | G10L 15/1822 704/244 |

(Continued)

OTHER PUBLICATIONS

Anonymous, "Holy Google Sheets! You Can Now Integrate the ChatGPT API", Retrieved from the URL: https://ai.plainenglish.io/holy-google-sheets-you-can-now-integrate-the-chatgptapi-b401ac065844, Mar. 8, 2023, 7 Pages.

(Continued)

*Primary Examiner* — Michael N Opsasnick

(57) ABSTRACT

Technology is disclosed herein for the integration of spreadsheet environments with LLM services. In an implementation, an application service receives a natural language input from a user associated with a spreadsheet hosted by a spreadsheet application. The application service generates a prompt based on the natural language input which includes asking a large language model (LLM) service to classify a statement in the input as referring to one of multiple capabilities of the spreadsheet application. The application service inputs the prompt to the LLM service and receives an output from the LLM service which identifies a determined one of the multiple capabilities. The application service (Continued)

generates a revised prompt based on the input and the determined one of the multiple capabilities and inputs the revised prompt to the LLM service.

20 Claims, 13 Drawing Sheets

(56) References Cited

U.S. PATENT DOCUMENTS

| | | | | |
|---|---|---|---|---|
| 2018/0239748 | A1* | 8/2018 | Zhang | G06F 3/0482 |
| 2019/0318010 | A1* | 10/2019 | Tamir | G10L 15/07 |
| 2019/0339769 | A1* | 11/2019 | Cox | G06F 3/016 |
| 2019/0341031 | A1* | 11/2019 | Cox | G10L 15/22 |
| 2020/0349178 | A1* | 11/2020 | Raju | G06F 16/23 |
| 2021/0109769 | A1* | 4/2021 | Yang | G06N 20/00 |
| 2024/0303441 | A1* | 9/2024 | Sobhy Deraz | G06T 11/206 |

OTHER PUBLICATIONS

Gislason, Hjalmar, "Generative AI and spreadsheets", Retrieved from the URL: https://medium.grid.is/gpt-3-and-spreadsheets-4808acfda30d, Feb. 8, 2023, 7 Pages.

Gislason, Hjalmar, "Launching GRID 2.0: the magical surface for numbers", Retrieved from the URL: https://grid.is/blog/launching-grid-2-0-the-magical-surface-for-numbers, Feb. 14, 2023, 3 Pages.

International Search Report and Written Opinion received for PCT Application No. PCT/US2024/018447, May 16, 2024, 17 pages.

Kogan Daniel, "ChatGPT and Excel: Excelhero", Retrieved from the URL: https://web.archive.org/web/20230306105400/https://excelhero.de/ki/chatgpt-und-excel/, Mar. 6, 2023, 15 Pages.

Maddigan, et al., "Chat2VIS: Generating Data Visualisations via Natural Language using ChatGPT, Codex and GPT-3 Large Language Models", In Repository of arXiv:2302.02094v1, Feb. 4, 2023, 14 Pages.

McNutt, et al., "On the Design of AI-powered Code Assistants for Notebooks", In Repository of arXiv:2301.11178, Jan. 26, 2023, 18 Pages.

Ragavan, et al., "GridBook: Natural Language Formulas for the Spreadsheet Grid", In Proceedings of the 27th ACM symposium on virtual reality software and technology, Mar. 22, 2022, pp. 345-368.

Ross, et al., "The Programmer's Assistant: Conversational Interaction with a Large Language Model for Software Development", In repository of arXiv:2302.07080v1, Feb. 14, 2023, 43 Pages.

Sarkar, et al., "What is it like to program with artificial intelligence?", In Repository of arXiv:2208.06213v1, Aug. 12, 2022, 26 Pages.

Wu, et al., "AI Chains: Transparent and Controllable Human-AI Interaction by Chaining Large Language Model Prompts", In Repository of arXiv:2110.01691, Oct. 4, 2021, 21 Pages.

Wu, et al., "PromptChainer: Chaining Large Language Model Prompts through Visual Programming", CHI Conference on human factors in computing systems extended abstracts, Apr. 27, 2022, pp. 1-10.

International Preliminary Report on Patentability received for PCT Application No. PCT/US2024/018447, mailed on Sep. 18, 2025, 10 pages.

* cited by examiner

600

The ask is:
Design me the schema for a shopping site

631

Routine "Create Table";
Name: Products
Columns: Product_ID, Product_Name, Price, Description, Category Routine "Create Table";
Name: Customers
Columns: Customer_ID, Customer_Name, Address, Phone_Number Routine "Create Table";
Name: Orders
Columns: Order_ID, Customer_ID, Product_ID, Quantity, Order_Date Routine "Create Table";
Name: Reviews
Columns: Review_ID, Customer_ID, Product_ID, Rating, Comment

The ask is:
I need to keep track of my shopping list, it is getting too expensive

633

Routine "Create Table";
Name: Shopping List
Columns: Item, Price

Routine "Create Pivot Table";
Table Connected To: Shopping List
Table Columns in Pivot Table Columns: Item
Table Columns in Pivot Table Rows: Price
Table Columns in Pivot Table Values: Price
Table Columns in Pivot Table Filters: None Routine "Create Chart";
Type: Bar Chart
Table Connected To: Shopping List
Columns Used: Item, Price

The ask is:
I need to keep track of my shopping list, i always have missing items in my fridge  635

→

Routine: Create Table
Name: Shopping List
Columns: Item, Quantity

Routine: Create Chart
Type: Bar Chart
Table: Shopping List
Columns: Item, Quantity Routine: Create Pivot Table
Table: Shopping List
Pivot Table Columns: Item
Pivot Table Rows: Quantity
Pivot Table Values: Quantity
Pivot Table Filters: None  636

FIGURE 6D

The ask is:
I have a startup company which things shall I track if I want to be like Microsoft?  637

→

Routine: Create Table
Name: Startup Company
Columns: Revenue, Expenses, Profit, Employees, Customers Routine: Create Chart
Type: Line Chart
Table: Startup Company
Columns: Revenue, Expenses, Profit Routine: Create Pivot Table
Table: Startup Company
Pivot Table Columns: Employees, Customers
Pivot Table Rows: Revenue, Expenses, Profit
Pivot Table Values: Revenue, Expenses, Profit
Pivot Table Filters: None Routine: Create Pivot Table
Type: Bar Chart
Pivot Table: Startup Company
Columns: Employees, Customers  638

FIGURE 6E

PROMPT TEMPLATE 732

```
Act as an analyst that has:
Table "Table 1" which contains:
Columns:
 - "Year"
 - "Category"
 - "Product"
 - "Sales"
 - "Rating"
Convert the ask below into a simple New Ask.
You MUST only use the columns available in the
table above in the new ask. The two asks must
generate the same query.

The ask: [INSERT USER'S QUERY]
```

USER INPUTS 722

A) "What do my customers like the most?"
B) "Which line of products should we stop selling?"
C) "Which product should I offer a discount on?"
D) "What is the gap in the ratings?"
E) "What is hot in 2017?"
F) "How did the Bikes do?"

LLM OUTPUTS 771

A) What is the highest rated product in each category?
B) Which products have the lowest rating and sales?
C) Which product has the lowest rating in each category?
D) What is the difference between the highest and lowest ratings for each year, category, and product?
E) What products had the highest rating in 2017?
F) What were the Sales and Rating of Products in the Category of Bikes in each year?

PROMPT TEMPLATE 733

If you are given the Ask at the end, which tool will you use to answer that ask? Select one of the Tools below. Select the best tools to use. You must select one.

"Query Existing Table": This tool lets you answer the question by building a query using only the columns available in the table above.
"What if Analysis": This tool let you simulate changes in the data to see different possible outcomes.
"Forecasting": This tool lets you predict future trends based on past trends in the data.
"General Knowledge": This tool lets you list general business advice based on your knowledge of the above table and the ask. You can ONLY use this tool if you cannot use any other tool.
"Out Of Scope": None of the tools can work.

The ask: [INSERT USER'S QUERY]

USER INPUTS 723

A) "How do I grow my business?"
B) "Will adding a discount make a difference?"
C) "Is there a wide gap in the ratings?"
D) "What do my customers like the most?"
E) "Format cell"
F) "The sales this year were not as expected, for next year, if we added more sales people to the company, how would the sales numbers be?"

LLM OUTPUTS 772

A) General Knowledge
B) What if Analysis
C) Query Existing Table
D) Query Existing Table
E) Out Of Scope
F) What if Analysis

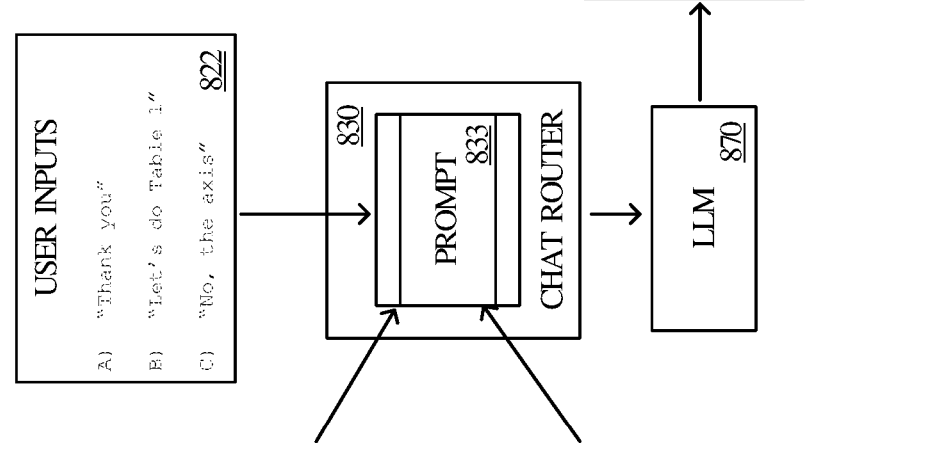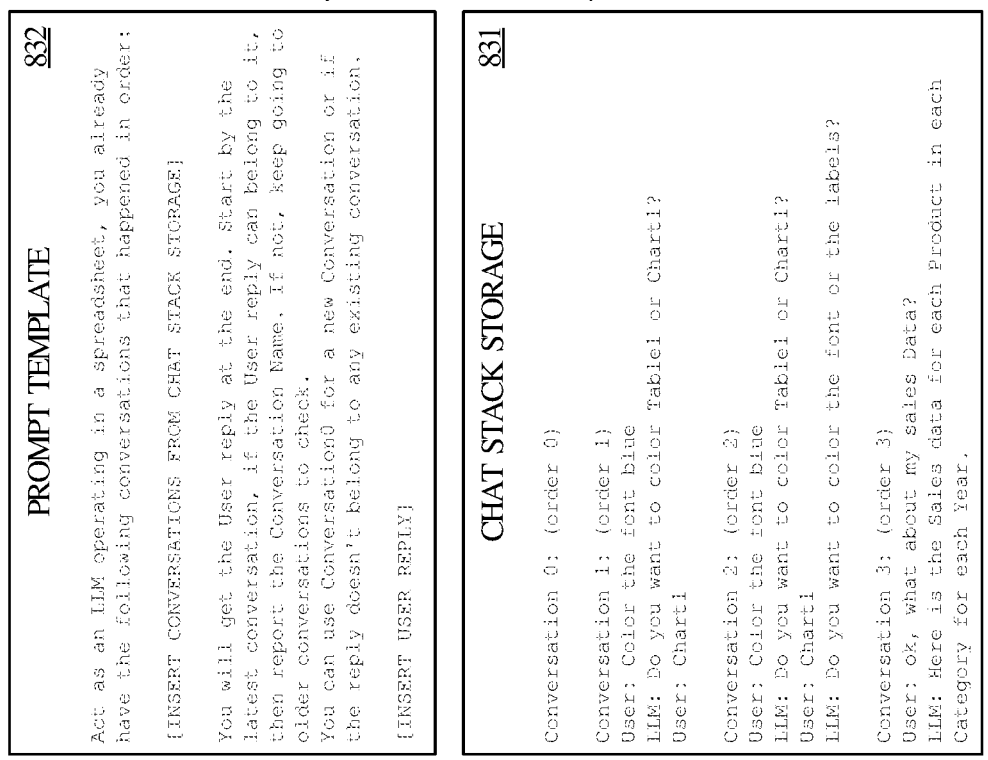
FIGURE 8

TASK DECOMPOSITION FOR LLM INTEGRATIONS WITH SPREADSHEET ENVIRONMENTS

RELATED APPLICATIONS

This application is related to and claims the benefit of priority to U.S. Provisional Patent Application No. 63/489,721, entitled TASK DECOMPOSITION FOR LLM INTEGRATIONS WITH SPREADSHEET ENVIRONMENTS, and filed on Mar. 10, 2023, the contents of which are hereby incorporated by reference in their entirety.

TECHNICAL FIELD

Aspects of the disclosure are related to the field of productivity applications and large language models and, in particular, to integrations there between.

BACKGROUND

Spreadsheet applications, such as Microsoft Excel®, are widely used for data analysis, data organization and management, and computational tasks involving quantitative as well as qualitative data. Given the broad range of functions and capabilities available in spreadsheet applications, special-purpose artificial intelligence (AI) models have been developed to aid users in figuring out how to accomplish particular tasks. These AI models, such Microsoft Excel®'s Insights engine, are trained on a vast quantity of spreadsheet data which enables them to identify patterns and generate insights into datasets. However, because the scope of the training is based entirely on spreadsheet data, this constrains the utility of these models to the domain of spreadsheet data and spreadsheet functionalities.

In more recent advances in AI technology, large language models (LLMs), which are a general-purpose type of AI model, have been developed which are capable of natural language communication. Transformer models are a type of AI model used in natural language processing that are designed to process sequences of words, such as sentences or paragraphs. LLMs such as Generative Pretrained Transformer (GPT) models and Bidirectional Encoder Representations from Transformer (BERT) models have been pre-trained on an immense amount of data across virtually every domain of the arts and sciences and have demonstrated the capability of generating responses which are novel, open-ended, and unpredictable.

However, harnessing this capability comes at a cost: LLM integration can introduce latency which negatively impacts the user experience; LLMs require a tremendous amount of compute power to function; and LLMs are known to hallucinate—that is, to imagine information which does not actually exist. Moreover, given the diverse subject matter in the training data used to train LLMs, LLMs may generate a response to an inquiry which diverges so far from what the user is asking that the response ends up being useless.

OVERVIEW

Technology is disclosed herein for the integration of spreadsheet environments with LLM services. In an implementation, an application service receives a natural language input from a user associated with a spreadsheet hosted by a spreadsheet application. The application service generates a prompt based on the natural language input which includes asking a large language model (LLM) service to classify a statement in the input as referring to one of multiple capabilities of the spreadsheet application. The application service inputs the prompt to the LLM service and receives an output from the LLM service which identifies a determined one of the multiple capabilities. The application service generates a revised prompt based on the input and the determined one of the multiple capabilities and inputs the revised prompt to the LLM service.

In an implementation, the application service receives an output from the LLM service in response to the prompt which includes a clarifying question. The application service sends the clarifying question to the user interface of the spreadsheet application.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 6A-6E illustrate an operational scenario involving task decomposition for an LLM integration in a spreadsheet environment in an implementation.

FIGS. 7A and 7B illustrate operational scenarios involving task decomposition for an LLM integration in a spreadsheet environment in an implementation.

FIG. 8 illustrates an operational scenario involving task decomposition for an LLM integration in a spreadsheet environment in an implementation.

DETAILED DESCRIPTION

Figure 1:
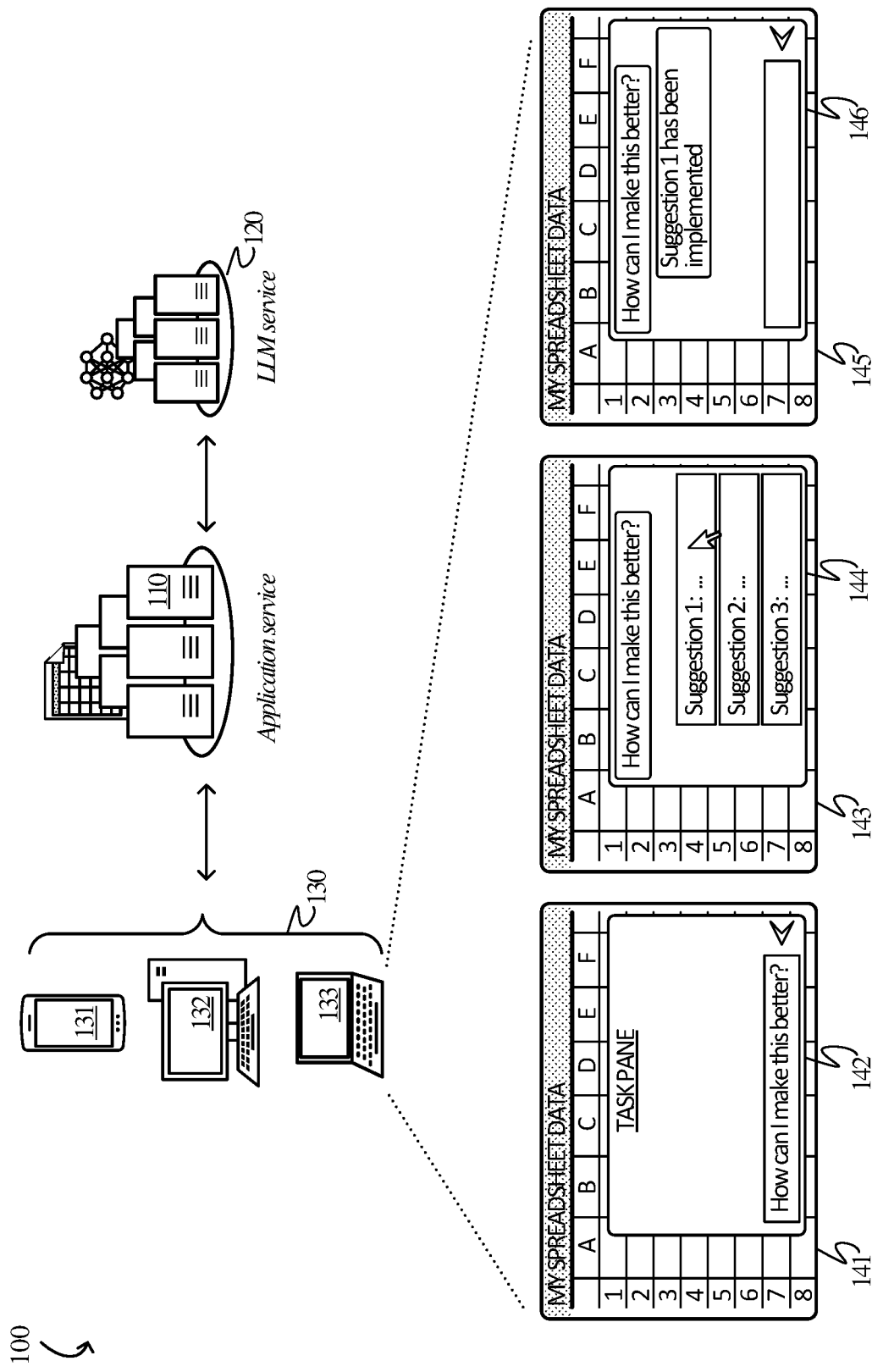
FIG. 1 illustrates an operational environment of an LLM integration with a spreadsheet environment in an implementation.

Various implementations of are disclosed herein for LLM integrations in a spreadsheet environment or productivity application environment capable of hosting a spreadsheet, table, or the like. The application, implemented in software on one or more computing devices, receives a natural language (NL) input from a user in the context of a spreadsheet and generates a prompt based on the natural language input and at least a portion of the spreadsheet. The application submits the prompt to a large language model (LLM) service (or "LLM") and receives a reply from the LLM. The application then generates a response to the user input based on the reply from the LLM.

The reply from the LLM received by the application can include a suggestion for modifying the spreadsheet, such as adding a calculated column along with a spreadsheet formula. In some implementations, the reply from the LLM includes a self-evaluation of its suggestion, and the application decides whether to display the suggestion or information in a task pane of the user interface based on the suggestion according to the self-evaluation.

Transformer models, of which LLMs are a type, are a class of deep learning models used in natural language processing (NLP) based on a neural network architecture which use self-attention mechanisms to process input data and capture contextual relationships between words in a sentence or text passage. Transformer models weigh the importance of different words in a sequence, allowing them to capture long-range dependencies and relationships between words. GPT, BERT, ERNIE (Enhanced Representation through kNowledge IntEgration), T5 (Text-to-Text Transfer Transformer), and XLNet models are types of transformer models which have been pretrained on large amounts of text data using self-supervised learning techniques such as masked language modeling and next token prediction. This pretraining allows the models to learn a rich representation of language that can be fine-tuned for specific NLP tasks, such as text generation, language translation, or sentiment analysis.

In some implementations of LLM integrations in a spreadsheet environment, the user-supplied natural language input includes text which expresses a general inquiry about the content of the spreadsheet, and the reply from the LLM includes a general description about the content of the spreadsheet. For example, the input may broadly request an idea or suggestion to make a data table of the spreadsheet better without reference to improving a particular aspect of the data table, such as a column, row, or format of an element of the table, and without requesting a particular type of analysis of data in the table. The LLM may reply with a summary describing the table, the information it contains, the scope of the data in the table, possible uses of the table, and so on. The application displays the reply provided by the LLM in a task pane in the user interface of the application. In some implementations, the application may display the reply with graphical input devices by which the user can interact with the reply, such as entering a second input in response to the reply from the LLM (e.g., asking for more information about an aspect of the reply), copying the reply to a clipboard, requesting more information about how the reply was generated, and so on.

In some scenarios, the user's general inquiry is ambiguous or underspecified, and the application prompts the LLM to interpret the reply in multiple ways and to generate suggestions based on the multiple interpretations. The accuracy or appropriateness of the suggestions with respect to the inquiry may depend on additional information not provided in the inquiry, such as the user's possible intentions in making the inquiry. For example, the user may ask, "How can I get better results?" The application may include in its prompt to the LLM an instruction to interpret the inquiry in multiple ways and to generate suggestions based on the interpretations. The application presents the suggestions generated by the LLM to the user in the task pane. The application may submit a follow-up prompt based on the user's selection of a suggestion including, in the contextual information of the prompt, the selection made by the user thereby to receive a more focused reply or suggestion from the LLM.

In some implementations, the user's natural language input includes text which expresses a request to modify a specified portion of the spreadsheet in a specific way, and the reply from the LLM includes a specific suggestion for modifying the spreadsheet in the specific way. For example, the user may submit a request in the user interface of the application to summarize sales data which is listed in multiple columns of a data table of the user's spreadsheet. The application will configure a prompt which contains the substance of the request along with a relevant portion of the spreadsheet (e.g., the column headers, row headers, and the first five rows of table data) which it submits to the LLM. The LLM, upon receiving the configured prompt, generates a reply which suggests adding a column which computes a total sales quantity based on year-to-date (YTD) sales data along with a spreadsheet formula to calculate the quantity. Based on the reply, the application displays the suggestion along with the formula in the user interface of the spreadsheet. In an implementation, the application generates a preview of the column to be added to the data table based on the suggestion, i.e., a column calculating YTD sales data based on the table data and using the formula provided in the reply of the LLM, which the user may then direct the application to implement.

In some implementations, the user's natural language input includes text which expresses a request including a hypothetical scenario based on the spreadsheet data. For example, the user may pose a "What if" type question which involves analyzing the spreadsheet data to generate an inference or a predicted result. The application will configure a prompt which contains the substance of the request along with a relevant portion of the spreadsheet (e.g., the column headers, row headers, and the first five rows of table data) which it submits to the LLM. The LLM, upon receiving the configured prompt, generates a reply which suggests a formula by which a predicted result can be calculated, along with a description of the formula and an explanation of the formula. The application generates a response to the input based on the reply from the LLM, which can include displaying a smaller data table in the task pane which demonstrates how the predicted result is calculated.

In responding to the user's input, the application extracts suggestions (e.g., suggested formulas) based on the reply from the LLM and displays the suggestions in the user interface of the application. The application determines an order in which to display the suggestions based, for example, on self-evaluations of the suggestions by the LLM. For example, the reply may suggest three formulas and indicate that one of the formulas is the most relevant with respect to the input or the prompt. In the user interface, the user can select a suggestion for implementation, such as implementing a suggested table name or table format, or ask for more information about a suggestion, such as a detailed explanation of a suggested formula.

In some implementations, when the application sends a portion of the spreadsheet (e.g., a portion of a data table in a spreadsheet) to the LLM along with a prompt, the application may rename the row or column headers when the application determines that the headers may confuse or mislead the LLM. For example, the application may expand abbreviations in the column headers of a data table. The application stores a correspondence between the original column headers (i.e., those displayed in the user interface) and the column headers which are supplied to the LLM in the prompt. The application uses the correspondence when displaying the reply in the user interface by translating the reply so it refers to the original column headers in place of the column headers supplied to the LLM (e.g., replacing the expanded-form words or terms with their abbreviations).

To generate a prompt based on a user's natural language input, the application will configure the prompt according to one or more of: the scope of the problem, the tasks to be completed, illustrative examples, sample data or spreadsheet contextual information, rules, the output format, and a cue to get the LLM to complete the task and not ramble. The scope of the problem refers to the domain in which the problem is to be addressed. For example, the prompt may instruct the LLM to limit its reply to Microsoft Excel® formulas and not Google Sheets formulas. The tasks to be completed include instructions, such as, "generate a formula to do X and self-evaluate the formula." Illustrative examples can include an example of how to self-evaluate a formula when the formula is relatively complex. An illustrative example provides the LLM with guidance on how to complete a task of the prompt. Sample data refers to selecting a portion of the data in a spreadsheet (e.g., the first five rows of data) to send with the prompt to provide the LLM with contextual information. Rules are specific rules by which the LLM is to answer the inquiry. For example, the prompt may tell the LLM not to fix typos detected by the LLM in column headers. Rules may be specific to the scope of the prompt. The output format specifies that the reply of the LLM will be in a parse-able format, such as enclosing elements of the reply within semantic tags or within a JavaScript Object Notation (JSON) data object, so the application can extract the elements and present the information in a natural language format for the user.

Other factors that affect the output of or reply by the LLM are the sequencing of the components of the prompt, examples in relation to the tasks, repetitions, and special tokens. The sequencing of the components refers to the various parts of the prompt being configured or stitched together in different ways. Because the LLM may weight the parts of the prompt according to how close they are to the end of the prompt (e.g., the parts that are closer to the end of the prompt more heavily), the application can leverage this characteristic to get the LLM to focus on the spreadsheet data and avoid a reply from the LLM which includes a generic formula or solution or which refers to imaginary data. For example, the prompt may position spreadsheet contextual information or domain toward the end of the prompt. The examples provided in the prompt can be highly influential with respect to the quality of the output from the LLM. For example, using a specific type of date format in an example can influence the LLM to use a similar data format in the formula it produces. Repetition of parts of the prompt may be necessary to remind the LLM or to keep the LLM on task. Special tokens are certain words or tokens (i.e., "magic words") that can influence the quality of the output that the LLM model produces. For example, the presence of the word "relationship" in the prompt may produce higher quality formulas.

In some implementations, the application configures a prompt based on a user inquiry to task the LLM with producing multiple alternative suggestions in response to the prompt along with self-evaluations of the suggestions. In an implementation, the application requests the LLM categorize the multiple suggestions that it generates according to correctness, accuracy, appropriateness, toxicity (i.e., containing offensive content), and so on. For example, where the user input relates to computing an average of data in a data table, the LLM may produce formulas for generating columns for various types of averages, such a mean, a weighted mean, a trimmed mean, a median, a mode, and so on. The prompt may further task the LLM with self-evaluating the suggestions according to the contextual data provided in the prompt and eliminate suggestions which are inaccurate, inappropriate, low utility, or in which the LLM has determined a low level of confidence. For example, the LLM may determine that computing a mode and a weighted mean of the data will not be as useful, based on the contextual information, as the other types of averages. The LLM eliminates those suggestions and sends the remaining suggestions to the application for generating its response(s) to the input.

In some scenarios, if the LLM determines that all or almost all of its suggestions should be eliminated, the prompt tasks the LLM with generating an explanation for why a formula or specific suggestion could not be presented and what additional information would allow the LLM to provide a better (e.g., more useful) reply.

In requesting alternative suggestions, the prompt asks the LLM to generate a complete set of variations based on the substance of the prompt, regardless of the how broad or specific the user's input is. The application may order the alternative suggestions or eliminate suggestions based on their self-evaluations and present the alternative suggestions in the task pane of the user interface based on the self-evaluations.

In addition to or as part of the self-evaluation, the LLM may also be tasked in the prompt with producing an evaluation of intent quality and/or problem difficulty. Intent quality refers to the quality of the user query with respect to toxicity, ambiguity, relevance to the data, and so on. Problem difficulty refers to whether the formula generated by the LLM is easy or difficult (e.g., simple or complex). For example, if the user request is determined to be ambiguous, the application may direct the LLM to produce a formula and suggest alternative interpretations of the query rather than simply responding that the LLM does not understand the request. With alternative interpretations of the query, alternative suggestions can be generated to present to the user in the user interface. Selections made by the user to the alternative suggestions (e.g., the user selects one of the suggestions for implementation) provide additional contextual information for prompts based on follow-on inputs made by the user.

In some scenarios, the application displays in the user interface of the spreadsheet application a task pane including a chat interface by which the application can receive user-supplied natural language inputs and display responses to the inputs based on the replies generated by the LLM. The task pane may also include graphical input devices by which the user can make selections, such as selecting one of multiple alterative suggestions. In some implementations, the application may display a formula suggested by the LLM with a natural language explanation of the formula. The application may also display a data table in the task pane to demonstrate a calculation suggested by the LLM using data from the spreadsheet.

The chat interface displays a turn-based conversation through which the user can iterate or step through multiple revisions of the spreadsheet which are responsive to the user's inquiries. As more inputs are received, the chat history adds to the contextual information that is used by the LLM to provide more accurate results, i.e., results which are increasingly responsive to the user's inquiries during the conversation. As the LLM is presented with more contextual information, the results (i.e., suggestions) generated by the LLM will be more specific to the user's inquiries and to the spreadsheet context.

In an implementation, the application tailors the natural language input to generate a prompt such that the LLM will produce its reply optimally in terms of latency, creativity, utility, coherence, and so on. The application may rewrite or reconfigure the user-supplied input to cause the LLM to generate a reply with minimal latency to minimize negative impacts to the user experience and costs to productivity. The application may also tailor the natural language input to more fully leverage the creativity of the LLM while reducing the probability that the LLM will, for example, digress or hallucinate (i.e., refer to or imagine things that do not actually exist) which can frustrate the user or further impair productivity.

Turning now to the Figures, FIG. 1 illustrates operational environment 100 in an implementation. Operational environment 100 includes application service 110, LLM service 120, and computing devices 130. Application service 110 hosts a productivity application such as a spreadsheet application (e.g., Microsoft Excel®) to endpoints such as computing devices 130 which execute applications that provide a local user experience and that interface with application service 110. The applications running locally with respect to computing devices 130 may be natively installed and executed applications, browser-based applications, mobile applications, streamed applications, or any other type of application capable of interfacing with application service 110 and providing a user experience, such as the user experiences 141, 143, and 145. The spreadsheet environment of application service 110 may be implemented a natively installed and executed application, a browser-based application, or a mobile application, and may execute in a stand-alone manner, within the context of another application such as a presentation application or word processing application, with a spreadsheet functionality, or in some other manner entirely. LLM service 120 hosts a generative pretrained transformer (GPT) computing architecture such as GPT-3®, GPT-3.5, ChatGPT®, or GPT-4.

Figure 10:
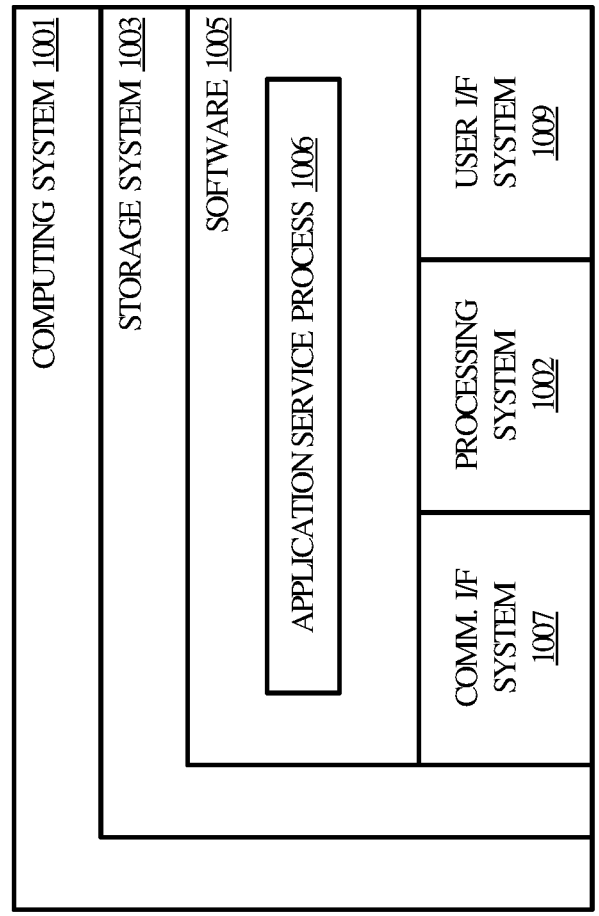
FIG. 10 illustrates a computing system suitable for implementing the various operational environments, architectures, processes, scenarios, and sequences discussed below with respect to the other Figures.

Computing devices 130 are representative of computing devices, such as laptops or desktop computers, or mobile computing devices, such as tablet computers or cellular phones, of which computing device 1001 in FIG. 10 is broadly representative. Computing devices 130 communicate with application service 110 via one or more internets and intranets, the Internet, wired or wireless networks, local area networks (LANs), wide area networks (WANs), and any other type of network or combination thereof. A user interacts with the productivity application of application service 110 via a user interface of the application displayed on any of computing devices 130. User experiences 141, 143, and 145, including task panes 142, 144, and 146, respectively, are representative of user experiences of a spreadsheet environment of a productivity application hosted by application service 110 in an implementation.

Application service 110 is representative of one or more computing services capable of hosting a productivity application such as a spreadsheet application and interfacing with computing devices 130 and with LLM service 120. Application service 110 may be implemented in software in the context of one or more server computers co-located or distributed across one or more data centers.

LLM service 120 is representative of one or more computing services capable of hosting an LLM computing architecture and communicating with application service 110. LLM service 120 may be implemented in the context of one or more server computers co-located or distributed across one or more data centers. LLM service 120 hosts a deep learning AI transformer model, such as ChatGPT®, BERT, ERNIE, T5, XLNet, and the like, which is integrated with the spreadsheet environment associated with application service 110.

In operation, the user of computing device 133 interacts with application service 110 via a natural language interface of task pane 142 in user experience 141. In user experience 141, the user keys in a natural language statement or inquiry ("How can I make this better?"). Application service 110 creates a prompt based on the user's statement including contextual information of the spreadsheet. Application service 110 submits the prompt to LLM service 120. LLM service 120 generates a reply to the prompt and sends the reply to application service 110. In an implementation, application service 110 instructs LLM service 120 in the prompt to provide multiple interpretations of the inquiry and to generate multiple alternative suggestions based on the interpretations.

Application service 110 configures a response to the user's statement based on the reply from LLM service 120 and displays the response in user experience 143. In task pane 144 of user experience 143, application service 110 displays three cards, each containing, in a natural language format, one of three suggestions provided by LLM service 120. Application service 110 may display the suggestions according to how LLM service 120 self-evaluated the suggestions, e.g., according to relevance to the input or correctness. In some implementations, when the user moves the cursor to hover over a card in the user interface, application service 110 displays a preview of the suggestion (such as a preview of column to be added) in the spreadsheet. Application service 110 may also include graphical buttons by which a user can request more information about a suggestion or report an inappropriate suggestion to application service 110.

Upon receiving the user's selection of the first suggestion in task pane 144, application service 110 implements the suggestion by adding a column (not shown) to the spreadsheet data. In task pane 146 of user experience 145, application service 110 configures and displays suggested actions in natural language based on the chat history and spreadsheet contextual information. The suggested actions may be based on a higher-ranked suggestion received from LLM service 120 in response to the user's original input.

Notably, application service 110 may execute a specific-purpose AI model, such as Microsoft Excel Insights, independent from the integration of the LLM model in the spreadsheet environment. Inquiries submitted by the user to the specific-purpose AI model may execute in parallel with the application service methods disclosed herein. For example, a user may use Insights to generate a pivot table relating to a data table in the spreadsheet environment, where the pivot table is generated by Insights based on the entire data table. In addition to and in parallel with the interaction with Insights, the user may submit an input to task pane 142 causing application service 110 to generate and send a prompt to LLM service 120 based on the input, with the prompt including a portion of the data table, such as the first 3-5 rows or a particular column of data.

Figure 2:
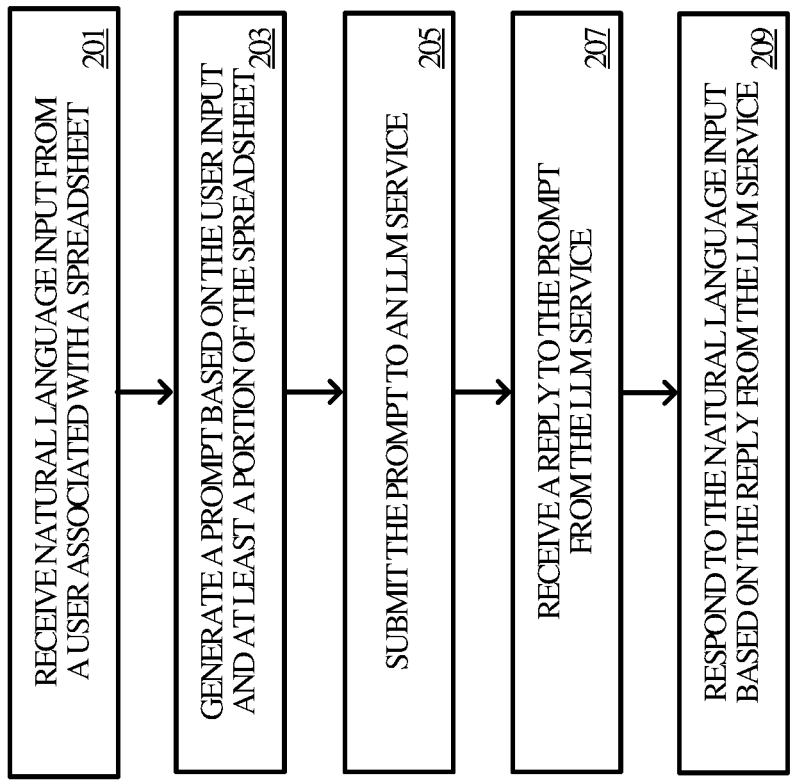
FIG. 2 illustrates a method of operating a spreadsheet application in an implementation.

FIG. 2 illustrates a method of operation for an LLM integration with a spreadsheet environment in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

An application service hosts a web-based productivity application such as a spreadsheet and displays a user interface for a client application of the application service on a user computing device remote from the application service. The application service also interfaces with an LLM service based on inputs received from the user. In an implementation, the application service receives a natural language input from the user in association with the application (step 201). The user keys in a natural language input in a chat interface in the user interface displayed on the computing device. The natural language input may refer to the spreadsheet generally, to a data table of the spreadsheet, to data in the spreadsheet, such as rows or columns of data, to the format of the spreadsheet, etc.

The application service generates a prompt for the LLM service based on the input and at least a portion of the spreadsheet (step 203). In an implementation, the prompt includes contextual information, such as the chat history and a portion of the spreadsheet including row and column headers and a subset of the data. The prompt may also include rules, such as a rule to provide a self-evaluation of suggestions generated by the LLM service. The prompt may also direct the LLM service to assess the level of complexity or difficulty of a suggestion or of a formula of a suggestion and to provide a natural language description and/or explanation of the formula. The prompt may also direct the LLM service to assess the substance of the inquiry in terms of the user's intent, e.g., whether the intent is ambiguous, whether the request is directed to analyzing the data, or whether the request is directed to generating more user-friendly table format.

The prompt may also direct the LLM service to provide the suggestions in a parse-able output format, that is, in a format which facilitates extracting the components of the reply based on information type. The parse-able output format can include enclosing elements of the reply in tags (e.g., semantic tags such as <suggestion> and </suggestion>, <formula> and </formula>, etc.), as a JSON data object, or in another type of data structure. The prompt may also include a rule or instruction to generate multiple suggestions in response to the input or multiple suggestions based on multiple interpretations of the input.

Having configured a prompt based on the user input, the application service submits the prompt to the LLM service (step 205). The application service receives a reply to the prompt from the LLM service (step 207). The reply to the prompt may include one or more suggestions generated based on the prompt and in accordance with any rules, instructions, or parameters provided in the prompt.

Having received a reply from the LLM service, the application service responds to the input based on the reply (step 209). In some implementations, the application service generates a graphical card for each suggestion for display in the user interface. For example, a suggestion may include a spreadsheet formula which references existing columns in the spreadsheet along with a brief title and description of the formula and an explanation of the formula. The application service generates a card for the suggestion which presents the elements of the suggestion in a user-friendly or natural language format. The card may also include graphical buttons by which the user can select to, for example, implement the suggestion in the spreadsheet (e.g., add the suggestion column to the spreadsheet), to view a more detailed explanation of a formula, to see a sample calculation of the formula, and so on. In some scenarios, the application service may create and display a data table in the user interface which demonstrates a suggestion calculation or suggested table configuration. The application service may also present the user with the option of creating a new worksheet including the data table suggested by the LLM service. In some implementations, the application service may also display further inquiries suggested by the LLM service to discern the intent of the user and provide a more focused reply.

In some implementations, the user's input may refer to performing an analysis of the data in the table to generate a prediction, such as in a what-if scenario. The LLM service may present suggestions for answering the user's query but may also present additional suggestions related to the input. The LLM service may generate suggestions relating to data columns or rows to be added, formulas for quantities to be calculated, table formatting, summary tables based on the table data, and so on.

Referring once again to FIG. 1, operational environment 100 includes a brief example of process 200 as employed by application service 110 with respect to input received from computing device 131 and to replies received from LLM service 120.

In operational environment 100, a user at computing device 131 submits an inquiry to application service 110 which relates to a spreadsheet of a productivity application hosted by application service 110 and displayed in a client application or in a browser-based application on computing device 131. The input is provided in natural language, that is, as if the user is speaking to another person.

Application service 110 receives the input and generates a prompt to be submitted to LLM service 120 based on the input. The prompt includes contextual information, such as a chat history and spreadsheet data or metadata, such as a table name, worksheet name, or spreadsheet name, row and column headers, and at least a subset of the data, e.g., the first five or ten rows of data. Contextual information can also include the recent or latest actions performed by the user on the spreadsheet, such as the user creating a new column or entering a formula. Contextual information can also include errors detected in the spreadsheet.

In the prompt provided to LLM service 120, application service 110 may specify tasks to be performed by LLM service 120. Tasks in the prompt can include generating the reply in a particular output format and providing an analysis or evaluation of the suggestions in the reply such as the accuracy or appropriateness of the suggestion relative to the input, an evaluation of the complexity of a formula or calculation in a suggestion, an assessment of the ambiguity or intent of the input, and/or an interpretation of the substance of the input.

Next, application service 110 submits the prompt to LLM service 120. LLM service 120 generates a reply to the prompt and transmits the reply to application service 110. The reply may contain multiple suggestions for accomplishing a task or action proposed in the input. Suggestions can relate to aspects of the table format or table data. The scope of the suggestions may be novel and inventive based on LLM service 120's training with other spreadsheets, but the suggestions generated by LLM service 120 are constrained by the prompt to the domain of the spreadsheet application. For example, if LLM service 120 suggests a new type of data to be added to a spreadsheet, the suggested formula or the suggested output format of the formula will reference the functions or formatting rules of the application hosted by application service 110.

Application service 110 receives the reply from LLM service 120 and generates a response to the user's input based on the reply. The response to the input is displayed by application service 110 in the user interface of the application, such as in task pane 142 or chat interface. The response may include the reply or the suggestions within the reply presented in a natural language format. Suggested formulas may be displayed along with natural language descriptions and/or explanations of the formulas. The response may include suggestions for other actions the user may want to implement, such as suggesting a follow-on input or viewing a preview of a suggestion.

Figure 3:
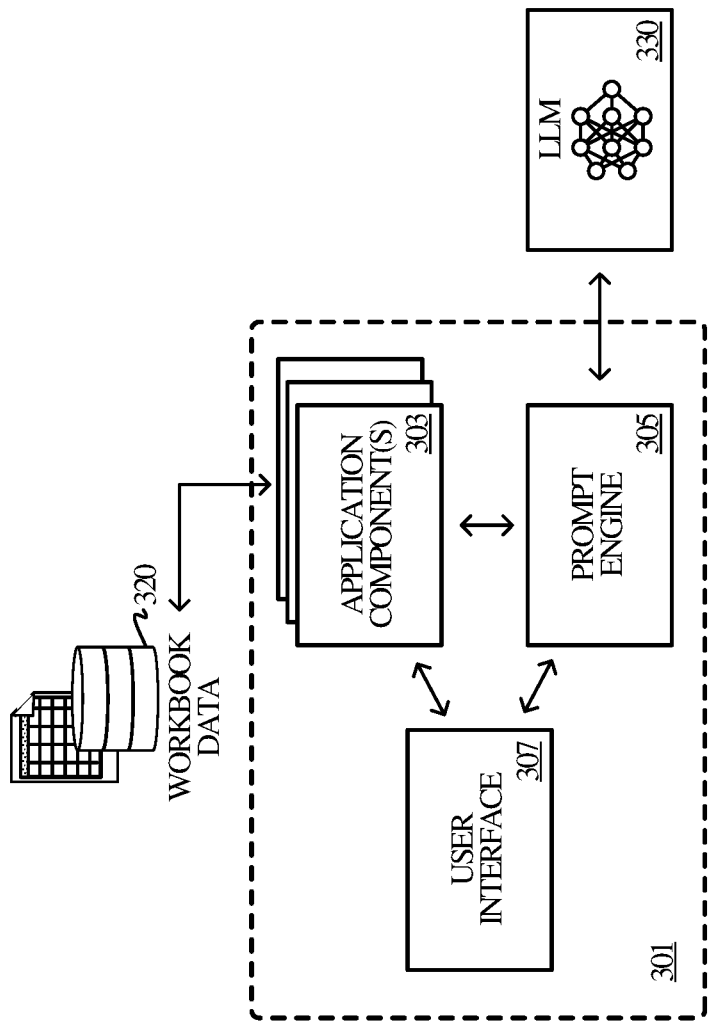
FIG. 3 illustrates a systems overview for integrating an LLM in a spreadsheet environment in an implementation.

Turning now to FIG. 3, FIG. 3 illustrates system architecture 300 including application 301, workbook data 320, and LLM 330. Application 301, of which application service 110 is representative, includes one or more application component(s) 303, prompt engine 305, and user interface 307. Application component(s) 303 (referred to hereinafter in the singular for the sake of clarity) are representative of the various components, engines, and modules of a spreadsheet application, such as computational engines, charting engines, macro engines, Visual Basic modules, formatting components, etc. Application 301 displays workbook data 320 in user interface 307 and receives user input relating to workbook data 320 from user interface 307. Prompt engine 305 of application 301 generates prompts for LLM 330 based on user input received from a user through user interface 307 and receives replies to the prompts from LLM 330.

Figure 4:
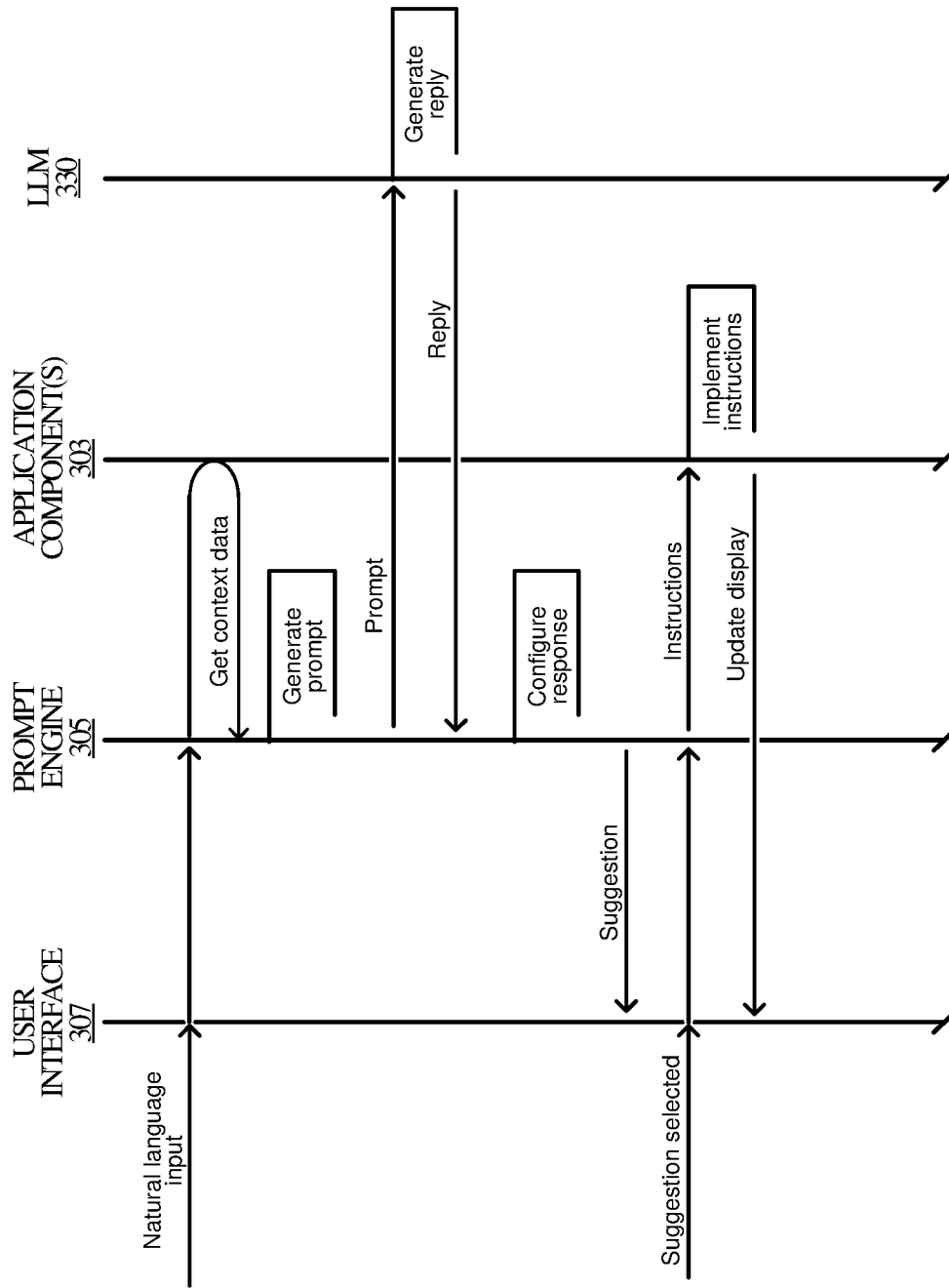
FIG. 4 illustrates an operational scenario for an LLM integration in a spreadsheet environment in an implementation.

FIG. 4 illustrates operational scenario 400 of an LLM integration with a spreadsheet environment and referring to elements of FIG. 3 in an implementation. In operational scenario 400, prompt engine 305 receives a natural language input from a user via user interface 307, such as in a task pane or chat interface in user interface 307. The input may be a text entry keyed into a textbox of user interface 307 by the user or a spoken communication from the user captured by a microphone on the user computing device and which is translated to text by a speech-to-text engine. The input includes a request or query regarding workbook data 320. Prompt engine 305 configures a prompt based on the input for submission to LLM 330.

To configure the prompt, prompt engine 305 identifies a prompt template according to the type of request in the input in an implementation. Using a selected prompt template, prompt engine 305 configures a prompt to include the input and contextual information from application 301, e.g., from various ones of application component 303. Contextual information may include a chat history of user inputs and replies from LLM 330 and spreadsheet data, such as table information and at least a portion of the spreadsheet data. The portion of spreadsheet data included in the prompt may be column headers, row headers, a table name, and the first few rows of data or another portion or subset of the data that is relevant to the request. For example, if the user input asks in user interface 307 how a column of last names can be added to a data table in workbook data 320 based on a name column in the data table, prompt engine 305 may provide several entries in the name column in the prompt.

Prompt engine 305 configures the prompt including parameters to direct LLM 330 to provide a focused response to the input. Prompt parameters include the scope of the prompt, the output format of the reply to produce a reply in a parse-able format, instructions or tasks, examples including sample data or sample data formatting, special tokens which influence the behavior of LLM 330, and so on. Prompt engine 305 may configure the order of the information in the prompt to position the most important information toward the end of the prompt based on LLM 330 weighting later prompt information more heavily.

Having configured a prompt, prompt engine 305 submits the prompt to LLM 330. LLM 330 generates a reply according to the prompt and sends the reply to prompt engine 305. Prompt engine 305 generates a response to the input based on the reply from LLM 330 and sends the reply to user interface 307 for display.

In user interface 307, application 301 receives an input from the user indicating a selection of a suggestion in the response. Based on the selection, prompt engine 305 sends instructions to various ones of application component(s) 303 to implement the suggestion. For example, where the suggestion includes a calculated column, the instructions include adding a column at a location in the data table and entering the suggested formula in the column cells. Application 301 updates workbook data 320 to include the implementation of the suggestion and sends an update to the display to user interface 307.

Based on the selected suggestion, prompt engine 305 sends the formula of the selected suggestion to application 301 along with instructions to add a column to the data table and enter the formula in the cells of the newly added column. The instructions may also include adding a column header to the column, which may be provided by LLM 330 in its reply. Application 301 implements the instructions including updating workbook data 320 to include the new calculated column and updating the display of workbook data 320 in user interface 307. For example, the instruction to add a column and insert the suggested formula into the cells may be sent to a formatting component of application component(s) 303, while the instruction to compute the formula may be sent to a calculation engine of application component(s) 303.

In yet another implementation of operational scenario 400, user interface 307 receives a natural language input from the user or a selection of a suggested action displayed in user interface 307. Prompt engine 305 configures a prompt based on the input, including context data from application 301, and sends the prompt to LLM 330.

In yet another implementation of operational scenario 400, user interface 307 receives a natural language input from the user or a selection of a suggested action displayed in user interface 307. Prompt engine 305 configures a prompt based on the input, including context data from application 301, and sends the prompt to LLM 330. Prompt engine 305 configures a response to the input based on the reply. The response is presented to the user in user interface 307, where the user selects a suggestion in response.

Subsequent to displaying an update to the display in user interface 307, the user provides additional natural language inputs to prompt engine 305 via user interface 307. The inputs may relate to the suggestion that was implemented, to another suggestion, to an error generated in relation to the implemented suggestion, or to another aspect of workbook data 320. The inputs trigger replies from LLM 330 and responses to the inputs based on the replies. With each new input, prompt engine 305 gathers context data from application 301 which includes the chat history, i.e., previous inputs, replies, suggestions, and so on. The series of inputs and responses result in a turn-based conversation. In some turns, the user may not select a suggestion but instead submit another natural language input.

It may be appreciated that the various implementations of operational scenario 400 are not mutually exclusive and can be combined in different ways to describe a variety of operational scenarios.

Figure 5:
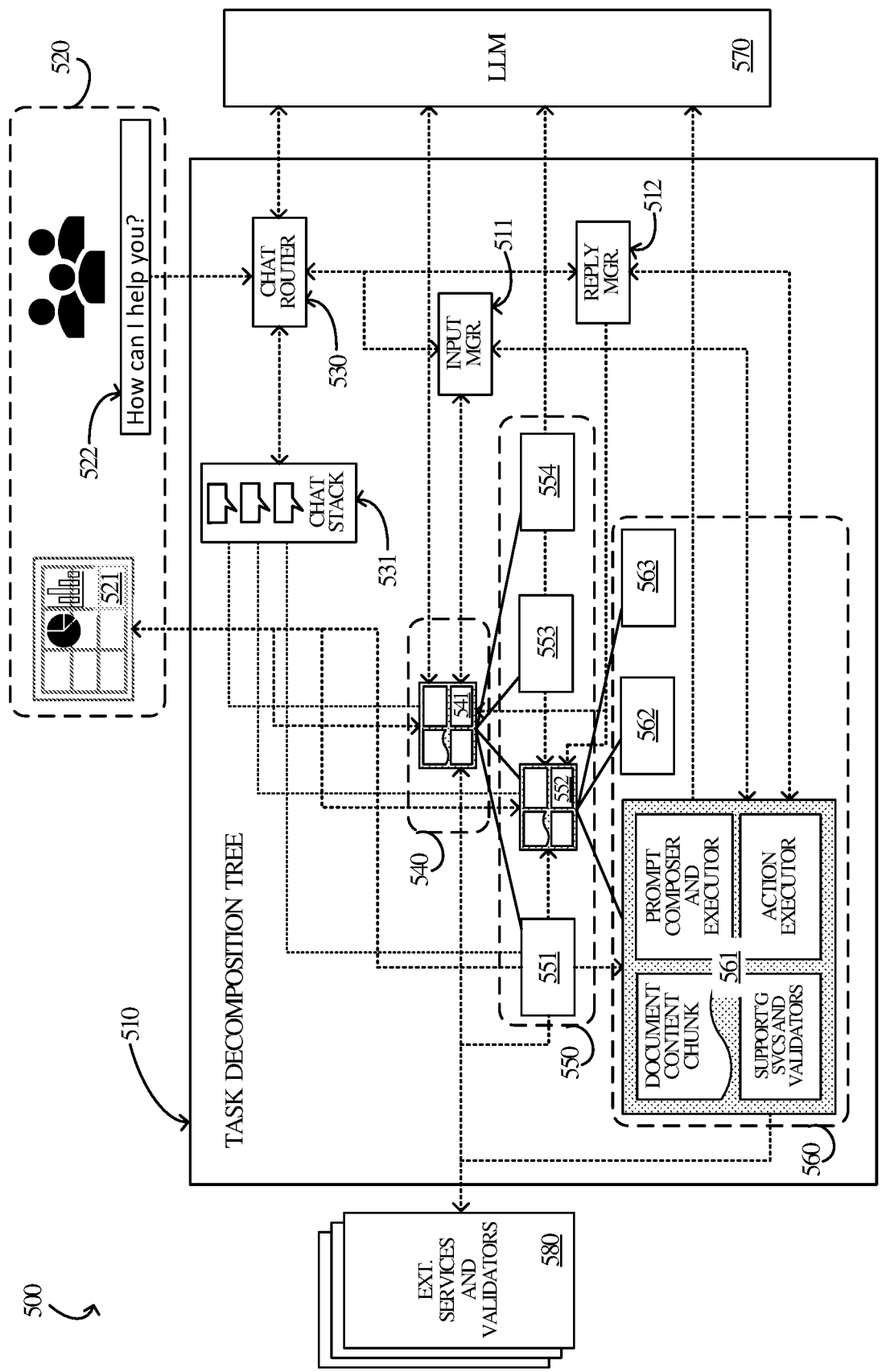
FIG. 5 illustrates an operational architecture for a task decomposition tree for an LLM integration in a spreadsheet environment in an implementation.

FIG. 5 illustrates operational architecture 500 for task decomposition for an LLM integration with a spreadsheet environment in an implementation. In operational architecture 500, user experience 520 of a spreadsheet application hosting spreadsheet 521 displays chat interface 522 by which to communicate with a user of spreadsheet 521. Spreadsheet 521 is a spreadsheet document including data, for example, a data table, and may include charts and/or graphs. The data in spreadsheet 521 may be organized according to row and/or column headers.

Operational architecture 500 further includes task decomposition tree (TDT) 510 of an application service associated with the spreadsheet application which communicates with user experience 520 via chat router 530. TDT 510 also communicates with LLM 570, for example, through an application programming interface (API) and with external services and validators 580 which can include tools and services, such as Microsoft Excel Insights, which interact with the application service. TDT 510 also includes input manager 511 and reply manager 512. Input manager 511 is a node of TDT 510 which receives user input from user experience 520 and routes the input to the appropriate node of TDT 510; reply manager 512 is a node of TDT 510 which receives replies from LLM 570 and routes the replies to the appropriate node of TDT 510. Input manager 511 and reply manager 512 may interact with chat router 530 to facilitate storing conversations in association with the various nodes of TDT 510. Reply manager 512 may also route queries generated by LLM 570 for the user, such as clarifying questions, to user experience 520.

TDT 510 includes a hierarchical node structure of multiple levels including levels 540, 550, and 560, with level 540 being the highest level in the hierarchy and with each level including one or more nodes. It may be appreciated that the number of levels and nodes of TDT 510 can vary from what is illustrated in FIG. 5. Each of nodes 541, 551-554, and 561-563 may include a document content chunk, a prompt composer and executer, supporting services and validators, and an action executor.

Chat router 530 of the application service relays communication between user experience 520 and various nodes of TDT 510. Chat router 530 manages chat stack storage 531 comprising information relating to communications between the various elements of operational architecture 500. Chat router also communicates with LLM 570.

In a highly simplified exemplary scenario of operational architecture 500, a user viewing spreadsheet 521 enters a natural language input in chat interface 522 regarding spreadsheet 521. The natural language input may broadly request an idea or suggestion to make a data table of the spreadsheet better without reference to improving a particular aspect of the data table, such as a column, row, or format of an element of the table, and without requesting a particular type of analysis of data in the table. The inquiry may include a request involving analysis of the data in spreadsheet 521, such as a forecast or prediction or identifying edge cases or outliers. In some situations, the user's inquiry may be ambiguous or underspecified. For example, the user may inquire, "How can I make this look more professional?" where "it" is unspecified and where "more professional" is largely a subjective matter.

Chat router 530 receives the input and routes the input to node 541 of level 540. Chat router 530 also configures a chat stack in chat stack storage 531 relating to the present communication between node 541 and chat interface 522. In an implementation, node 541 classifies the input received from a user for further response or handling by a node of level 550.

As the user input is relayed down through the hierarchy of TDT 510, each succeeding level refines the query of the user's input until sufficient information is gathered for a node to respond by outputting a response to the query (e.g., a suggestion for an action to be taken on spreadsheet 521) or to execute an action on spreadsheet 521. Moving the user input through the tree structure of TDT 510 effectively decomposes the task represented by or in the user's query so that the correct or most appropriate response can be identified. LLM 570 interacts with the nodes at various levels of TDT 510 to determine how the user input is to move through TDT 510, including generating inquiries to gather more information from the user to further the task refinement or decomposition.

In some scenarios, the user's input includes details which allow the user input to pass through a node without assistance from LLM 570. For example, if the initial input specified a particular action without indicating on which part of spreadsheet 521 to perform the action, once the targeted part is determined by a node, the task can be passed to the next node to perform the action without further input from the user.

Returning to the exemplary scenario of operational architecture 500, node 541 configures a prompt for submission to LLM 570 which includes the user input and instructions tasking LLM 570 to determine a capability or functionality of next level 550 to which the input pertains. The prompt includes contextual information from spreadsheet 521 such as column or row headers, table names, and at least a portion of the data.

In an implementation, the instructions in the prompt constrain the domain of the output from LLM 570 to selecting from among a finite number of choices to determine the appropriate next node of next level 550, but also presents LLM 570 with the option of asking a clarifying question which node 541 will relay to the user via chat interface 522. For example, the prompt may present LLM 570 with options such as "data analysis," "table design," "table creation," "data visualization," "workbook design," and so on. The prompt may also include an option when LLM 570 is unable to choose from the choices presented, such as "out of scope" or "none of the above." When LLM 570 is unable to choose from the choices presented, LLM 570 may be further tasked with generating a clarifying question to be posed by node 541 to the user to gather more information to make the selection or LLM 570 may be directed to take no further action.

Notably, as communication is exchanged between node 541 and the user (i.e., chat interface 522), chat router 530 stores the communications in a chat stack of chat stack storage 531 associated with level 540 or with node 541. Thus, if the user submits a spontaneous input, chat router 530 can submit the input along with the chat stacks of chat stack storage 531 to LLM 570 to determine which level or node should receive the input.

When LLM 570 selects a response from among the finite number of choices presented in the prompt from node 541, LLM 570 transmits an output including the selected choice to node 541 which directs node 541 to relay the user input to a node of the next level in the hierarchy, that is, to one of nodes 551-554 of level 550.

For example, in a prompt submitted by node 541 to LLM 570 including the query "How can I make this look more professional?", LLM 570 may reply with a clarifying question, in a natural language format, which asks what part of spreadsheet 521 the user wishes to make more professional-looking. Node 541 relays the question to chat interface 522 via chat router 530. Upon receiving an input from the user indicating, for example, "Table 1" of spreadsheet 521, node 541 relays this new information in another prompt to LLM 570. LLM 570 then returns output to node 541 to route the user input along with the new information to node 552 for "table design." In addition, chat router 530 generates a new chat stack associated with level 550 or node 552 in chat stack storage 531. The new chat stack includes the chat stack associated with node 541 and adds to it the interactions between node 552 and the user input received at chat interface 522.

Node 552, an intermediate node in TDT 510, generates a new prompt for LLM 570 by which to determine which node of level 560 should receive the user input. The prompt generated by node 552 constrains the domain of output from LLM 570 to another finite set of choices to select the next node. Node 552 relays the prompt to LLM 570 which, again, returns either a selection from the choices presented or a clarifying question.

For example, a prompt submitted by node 552 to LLM 570 may include functionalities associated with table design, such as "style," "font," "color," "data formatting," and so on, the selection of which causes node 552 to direct the user input to a node of level 560. LLM 570 may select, based on the user input, that the most appropriate functionality of level 560 to handle the user's input is "style." Upon returning its selection to node 552, node 552 relays the user input to the node of level 560 corresponding to "style," in this example, node 561.

Upon receiving the user input, node 561 configures a prompt for LLM 570 relating to how the functionality of node 561 can respond to the user input. Node 561 presents in its prompt a domain of choices from which LLM 570 is to select what it determines to be the most appropriate choice or choices. For example, LLM 570 may determine that a particular style of the styles presented by node 561 is widely deemed to be very professional looking or the most professional looking and returns this selection to node 561. Upon receiving the output from LLM 570, node 561 returns to user experience 520 a suggestion for the selected style or an action implementing the selected style on Table 1 of spreadsheet 521. In some implementations, user experience 520 may receive a suggested action from a node and display a preview of the action as applied to the targeted part of the spreadsheet along with a virtual input device (e.g., graphical button) by which the user can accept the action.

Figure 6A:
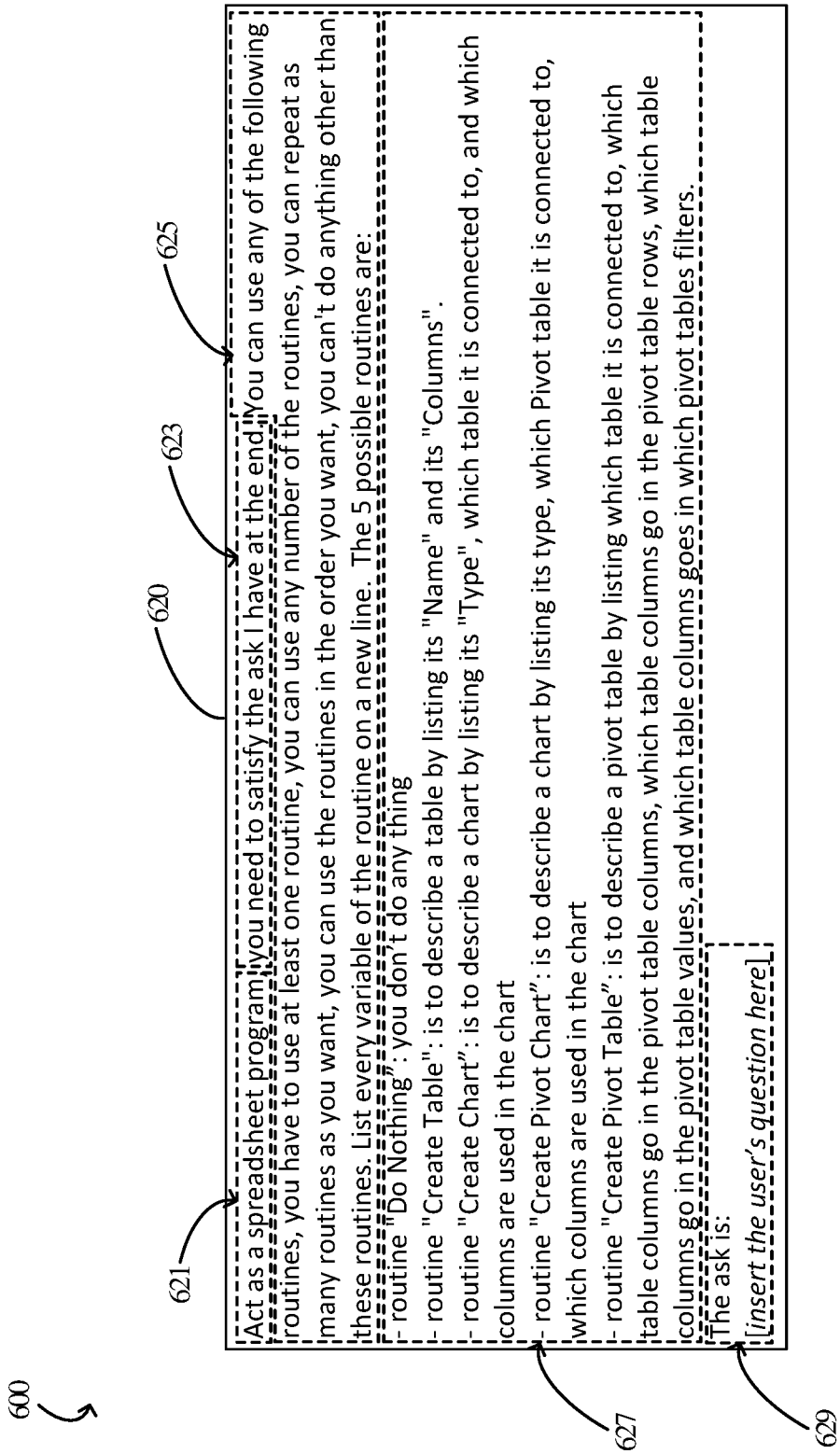

FIGS. 6A-6E illustrate operational scenario 600 for a task decomposition tree of an LLM integration in a spreadsheet environment in an implementation. In operational scenario 600, an LLM service in communication with an application service supporting spreadsheets receives prompts from a node of a task decomposition tree operated by the application service. The spreadsheet environment of the application service receives a user's input in, for example, a task pane or chat interface. In FIG. 6A, prompt template 620 illustrates a prompt template which a node of the task decomposition tree configures for submission to the LLM service. In instruction 621 of prompt template 620, the LLM service is tasked with acting in the role of an entity related to the environment providing the input ("spreadsheet program"). In instruction 623, the LLM service is given its task based on user input received from a user in a user interface of the spreadsheet application; instruction 623 is continued at the end of prompt template 620. In instruction 625, the LLM service is further tasked with choosing only from among a restricted number of routines in generating its output, thereby constraining the domain the output. Routines 627 include descriptions for how each routine is to be used including providing attributes specific to each routine. Notably, routines 627 include an option to "Do Nothing," such as when the input is outside the scope of any of the others of routines 627. At the end of prompt template 620 is the continuation of instruction 623, in instruction 629, including the user's input configured in the form of an "ask" which the LLM service is to satisfy. In an implementation, prompt template 620 also includes spreadsheet contextual information, such as column headers and sample data from the spreadsheet, as illustrated in node 561 ("Document content chunk") of FIG. 5.

FIGS. 6B-6E illustrate sample outputs 632, 634, 636, and 638 of an LLM service in response to asks 631, 633, 635, and 637, respectively, based on prompt template 620. In the example of FIG. 6B, the user's input in ask 631 is, "Design me the schema for a shopping site." Output 632 from the LLM service includes four "Create Table" routines with associated parameters for table names and columns. In FIG. 6C, for the user's input in ask 633, "I need to keep track of my shopping list, it is getting too expensive," the LLM service returns output 634 including three different routines from prompt template 620 along with their respective parameters. For exemplary asks 635 and 637 of FIGS. 6D and 6E, the LLM service generates outputs 636 and 638, respectively, including routines for creating pivot charts and tables along with associated parameters.

Continuing operational scenario 600, the node which submits prompts based on prompt template 620 may pass the output from the LLM service to nodes relating to each of the routines. For example, for FIG. 6E, the node may submit the first routine in output 638, "Create Table," along with name parameter "Startup Company" and columns parameter "Revenue, Expenses, . . . " to a next node for creating a table. The next node may execute table creation in the spreadsheet, or it may send another prompt to the LLM service seeking further refinement of the task (e.g., additional information). The column names supplied in output 638 may relate to actual columns in the associated spreadsheet (provided in the prompt as contextual information) or they may refer to columns to be created.

FIGS. 7A and 7B illustrate operational scenarios 700 and 710 for a task decomposition tree of an LLM integration in a spreadsheet environment in an implementation. In operational scenarios 700 and 710, a user seeks assistance using an external service or tool of a spreadsheet application, of which external services and validators 580 and/or supporting services and validators of any of the various nodes of TDT 510 in FIG. 5 are representative.

In operational scenario 700, a user submits user inputs 722 regarding a spreadsheet containing product sales data. The user submits, individually, ambiguous or underspecified natural language inputs A-F, shown in user inputs 722, in a user interface of the spreadsheet application hosting the spreadsheet. In the task decomposition engine of the application service, a classifier node receiving the inquiry from a chat router of the task decomposition engine configures a prompt based on prompt template 732 which constrains the responding LLM to generating a query for a data analysis engine, such as Microsoft Excel Insights or Microsoft Excel Analyze Data tool. In an implementation, the node submits spreadsheet contextual information along with the configured prompts, including a column and/or row headers, table names, and at least a sample of the spreadsheet data.

In response to each of the inputs of user inputs 722, the LLM generates a corresponding query shown in LLM outputs 771. The corresponding queries generated by the LLM may be submitted by the application service to the corresponding support service to generate a useful response for the user or the application service may present the query in the user interface with an explanation of how to submit the query to the supporting service.

In operational scenario 710 of FIG. 7B, the user again submits ambiguous or underspecified queries regarding spreadsheet data, for which a node, such as a classifier node, of the task decomposition tree tasks the LLM with determining which tool (if any) is best suited for answering the query.

Illustrated in user inputs 723 are various natural language inputs the user has submitted, individually, to the application service. A classifier node configures prompt template 733 for each of the inputs. Prompt template 733 constrains the output of the LLM to a type of analysis to be performed by a supporting service or tool. The set of choices provided in prompt template 733 include "Query Existing Table," "What If Analysis," "Forecasting," "General Knowledge," and "Out Of Scope." Prompt template 732 effectively tasks the LLM with classifying the user's input to determine which supporting tool or service to query and how to query it. In an implementation, the classifier node submits a spreadsheet contextual information along with the configured prompts, including a column and/or row headers, table names, and at least a sample of the spreadsheet data.

LLM outputs 772 illustrate responses to each of the inputs of user inputs 723 generated by the LLM service. Continuing operational scenario 710, the classifier node submits, for example, input C of user inputs 723 to a next node which handles What If analyses. The next node receives the user input from the classifier node and configures a prompt according to another template as part of a process of defining the task for eventual execution. For example, the LLM may detect the "wide gap in the ratings" in the spreadsheet data supplied in the prompt or it may supply a clarifying question to zero in on the meaning of the user's query.

FIG. 8 illustrates operational scenario 800 in an implementation of task decomposition of an LLM integration in a spreadsheet environment. An application service in communication with LLM 870, includes a task decomposition tree including chat router 830 and chat stack storage 831. The application service receives user inputs 822 in a user interface of a spreadsheet application hosted the application service. User inputs 822 relate to a spreadsheet of the spreadsheet application.

In operational scenario 800, chat router 830 receives user inputs 822 at various times during an interactive session with LLM 870, such as in response to a query from a node or spontaneously made. (Although spontaneous inputs A, B, and C are shown together, in operation, they may have been received at various times before or after other user inputs to the task decomposition tree via the application service.)

In operation, chat router 830 receives input A ("Thank you") of user inputs 822 and determines to which node (if any) the input should be sent. Chat router 830 configures prompt 833 based on prompt template 832 and input A of user inputs 822 and inserts chat stacks or conversations stored in chat stack storage 831. Each of Conversations 1, 2, and 3 stored in chat stack storage 831 are associated with a node of the task decomposition tree. Conversation 0 is reserved by chat router 830 for user inputs which cannot be attributed to any of the other conversations. Chat router 830 creates a chat stack as user input is transmitted through the task decomposition tree from one node to another by copying a stack to a new stack and adding to that stack subsequent interactions between the user and the node.

Chat router 830 submits prompt 833 to LLM 870. LLM 870 generates output according to prompt 833, which asks LLM 870 to determine which conversation input A belongs to. LLM 870 determines that input A belongs to Conversation 3.

Next, for input B ("Let's do Table 1") of user inputs 822, chat router 830 configures prompt 833 based on prompt template 832, input B, and conversations from chat stack storage 831. Chat router 830 submits prompt 833 with input B to LLM 870 which determines that input B belongs to Conversation 1. In Conversation 1, the user has responded to a clarifying question received from LLM 870 by the node sending the question about which part of the spreadsheet to take some action on, and the user's initial response was "Chart1." However, subsequent to that response, the user (presumably changing his/her mind or correcting a misstatement) changes the target of the action to Table 1 of the spreadsheet.

For input C ("No, the axis"), chat router 830 again configures prompt 833, now with input C and supplies prompt 833 to LLM 870. LLM 870 determines that input C was made by the user in response to Conversation 2. In Conversation 2, LLM 870 has posed a clarifying question (via the node associated with Conversation 2) about which part of Chart1 should be colored blue. The user's input indicates that the user wants the axis (and not the font or the labels) to be colored blue.

Figure 9:
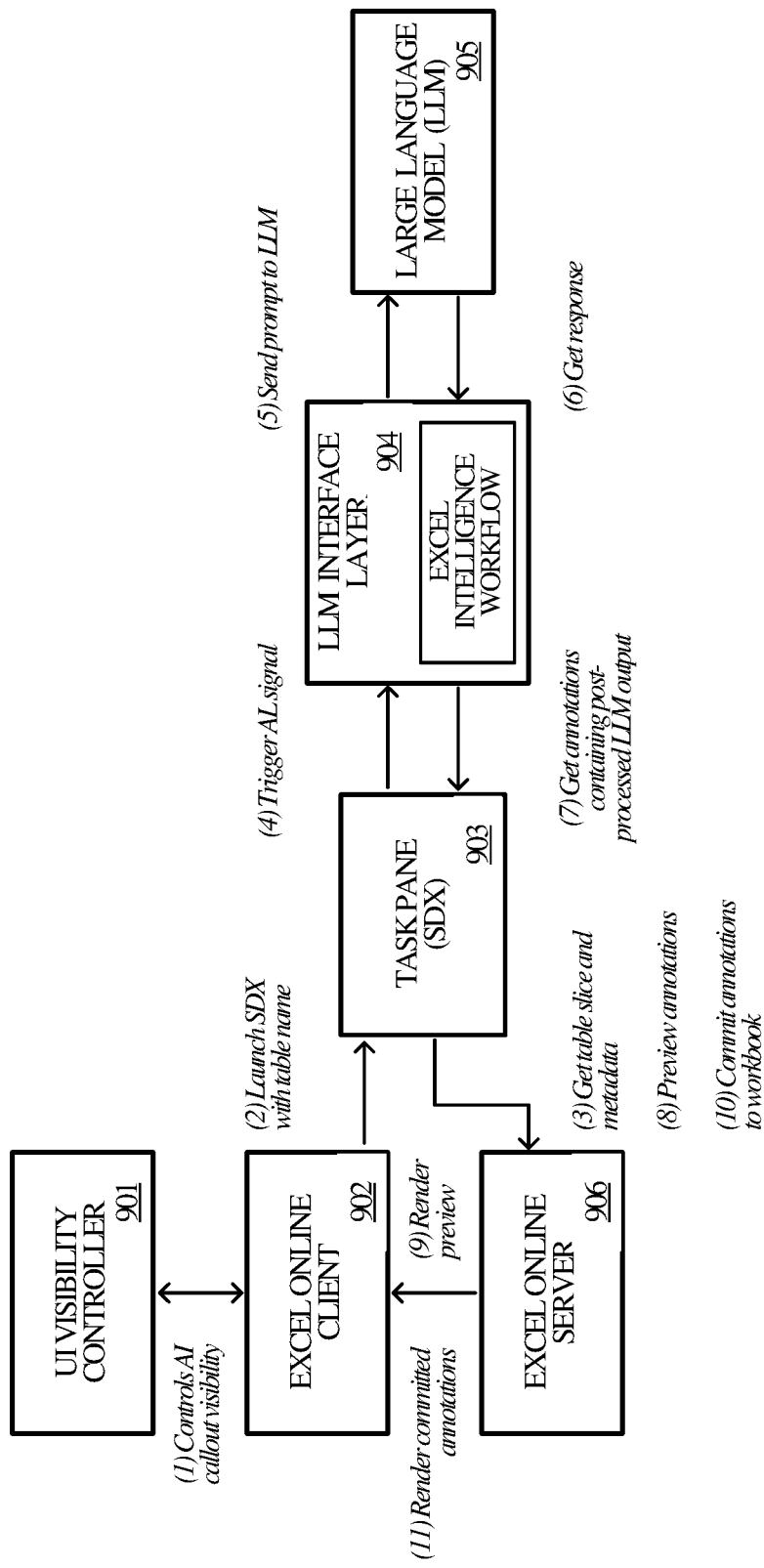
FIG. 9 illustrates a systems architecture for an LLM integration in a spreadsheet environment in an implementation.

Turning now to FIG. 9, FIG. 9 illustrates distributed software architecture 900 showing the components of a Microsoft Excel application including UI visibility controller 901 which controls AI callout visibility, Excel application server 906 and Excel client application 902 in an implementation. Software architecture 900 illustrates a process by which an Excel application responds to a natural language input from a user based on a reply to the input from an LLM.

Excel client application 902 executing on a user computing device in association with Excel application server 906. Excel client application 902 displays a user interface including task pane 903. Task pane engine 903 manages turn-based conversations with LLM 905 about data in a table in the user interface. Task pane engine 903 gets table slice data (e.g., spreadsheet contextual data and/or portions of the spreadsheet data) and spreadsheet metadata from Excel application server 906.

Excel client application 902 receives natural language input from a user and sends the input to task pane engine 903. Task pane engine 903 receives the natural language input from Excel client application 902 and sends the input to LLM interface layer 904. LLM interface layer 904 operates Excel intelligence workflow and communicates with LLM 905.

LLM interface layer 904 sends a prompt based on the natural language input to LLM 905. LLM 905 generates a reply to the prompt and transmits the reply to LLM interface layer 904. LLM interface layer 904 generates a response to the input based on the reply received from LLM 905 including post-processed output from LLM 905. LLM interface layer 904 sends the response to task pane engine 903 for configuring a display of the response. Task pane engine 903 writes the configured response to the spreadsheet file and sends the configured response to Excel application server 906 which renders and displays the response and previews in Excel client application 902.

FIG. 10 illustrates computing device 1001 that is representative of any system or collection of systems in which the various processes, programs, services, and scenarios disclosed herein may be implemented. Examples of computing device 1001 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 1001 may be implemented as a single apparatus, system, or device or may be implemented in a distributed manner as multiple apparatuses, systems, or devices. Computing device 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements application service process 1006, which is (are) representative of the application service processes discussed with respect to the preceding Figures, such as process 200. When executed by processing system 1002, software 1005 directs processing system 1002 to operate as described herein for at least the various processes, operational scenarios, and sequences discussed in the foregoing implementations. Computing device 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including application service process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing an application service process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing device 1001 is representative) overall from a general-purpose computing system into a special-purpose computing system customized to support an application service in an optimized manner. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method comprising, by a task decomposition tree of a spreadsheet application:
   receiving a natural language input from a user associated with a spreadsheet hosted by the spreadsheet application;
   in an upper-level node of the task decomposition tree, generating a prompt based on the natural language input and submitting the prompt to a large language model (LLM) service, wherein the prompt directs the LLM service to classify a statement in the natural language input as referring to one of multiple capabilities of the spreadsheet application;
   inputting the prompt to the LLM service;
   receiving output from the LLM service wherein the output either identifies a determined one of the multiple capabilities or asks a clarifying question;
   performing an action based on the output of the LLM service, wherein if the output identifies a determined one of the multiple capabilities, then the action comprises transmitting the natural language input to a lower-level node of the task decomposition tree associated with the determined one of the multiple capabilities and wherein if the output asks a clarifying question, then the action comprises sending the question to a user interface of the spreadsheet application; and
   storing conversations associated with the spreadsheet, wherein each conversation of the conversations is stored in association with a node of the task decomposition tree and wherein each conversation of the conversations includes natural language inputs from the user and outputs from the LLM service associated with the respective node.

2. The method of claim 1, wherein the prompt includes contextual information, wherein the contextual information includes a portion of spreadsheet data from the spreadsheet.

3. The method of claim 2, wherein the multiple capabilities include a data analytics engine, and wherein the prompt further directs the LLM service to generate a query for input to the data analytics engine based on the natural language input.

4. The method of claim 2, wherein the multiple capabilities include creating a data table based on the spreadsheet data, and wherein the prompt further directs the LLM service to identify table columns.

5. The method of claim 2, wherein the multiple capabilities include creating a chart based on the spreadsheet data, and wherein the prompt further directs the LLM service to identify a type of the chart and columns in the spreadsheet to be visualized by the chart.

6. The method of claim 1, wherein conversations associated with the spreadsheet are stored by a chat routing node of the task decomposition tree.

7. The method of claim 2, further comprising, by the chat routing node:
   creating a new conversation associated with the lower-level node;
   storing, in association with the new conversation, a conversation associated with the upper-level node; and
   storing the natural language input in association with the new conversation.

8. The method of claim 3, further comprising, by the chat routing node:
   receiving a second natural language input from the user associated with the spreadsheet;
   generating, by a second prompt based on the second natural language input, wherein the second prompt directs the LLM service to identify a conversation associated with the second natural language input;
   submitting the second prompt to the LLM service, wherein the second prompt includes the conversations associated with the spreadsheet;
   receiving a second output from the LLM service including an identified conversation, wherein the identified conversation comprises a conversation of the conversations associated with the second natural language input; and
   storing the second natural language input in association with the identified conversation.

9. A computing apparatus comprising:
   one or more computer-readable storage media;
   one or more processors operatively coupled with the one or more computer-readable storage media; and
   program instructions stored on the one or more computer-readable storage media that, when executed by the one or more processors, direct the computing apparatus to at least:
      receive natural language input from a user associated with a spreadsheet hosted by a spreadsheet application;
      in an upper-level node of a task decomposition tree, generate a prompt based on the natural language input, wherein the prompt asks a large language model (LLM) service to classify a statement in the natural language input as referring to one of multiple capabilities of the spreadsheet application;

input the prompt to the LLM service;

receive output from the LLM service, wherein the output identifies a determined one of the multiple capabilities;

in a lower-level node of the task decomposition tree, generate a revised prompt based on the natural language input and the determined one of the multiple capabilities;

input the revised prompt to the LLM service; and store conversations associated with the spreadsheet, wherein each conversation of the conversations is stored in association with a node of the task decomposition tree and wherein each conversation of the conversations includes natural language inputs from the user and outputs from the LLM service associated with the respective node.

10. The computing apparatus of claim 9, wherein the prompt comprises contextual information, wherein the contextual information includes a portion of spreadsheet data from the spreadsheet.

11. The computing apparatus of claim 10, wherein the multiple capabilities include a data analytics engine, and wherein the prompt further directs the LLM service to generate a query for input to the data analytics engine based on the natural language input.

12. The computing apparatus of claim 10, wherein the multiple capabilities include creating a data table based on the spreadsheet data, and wherein the prompt further directs the LLM service to identify table columns.

13. The computing apparatus of claim 10, wherein the multiple capabilities include creating a chart based on the spreadsheet data, and wherein the prompt further directs the LLM service to identify a type of the chart and columns in the spreadsheet to be visualized by the chart.

14. The computing apparatus of claim 9, wherein the program instructions further direct the computing apparatus to receive, in response to the revised prompt, a second output from the LLM service, wherein the second output identifies an action associated with the determined one of the multiple capabilities.

15. The computing apparatus of claim 9, wherein the program instructions further direct the computing apparatus to store the natural language input and the output from the LLM service in a chat datastore.

16. A method comprising:

receiving natural language input from a user associated with a spreadsheet hosted by a spreadsheet application;

in an upper-level node of a task decomposition tree, generating a prompt based on the natural language input, wherein the prompt asks a large language model (LLM) service to classify a statement in the natural language input as referring to one of multiple capabilities of the spreadsheet application;

inputting the prompt to the LLM service;

receiving output from the LLM service, wherein the output identifies a determined one of the multiple capabilities;

in a lower-level node of the task decomposition tree, generating a revised prompt based on the natural language input and the determined one of the multiple capabilities;

inputting the revised prompt to the LLM service; and storing conversations associated with the spreadsheet, wherein each conversation of the conversations is stored in association with a node of the task decomposition tree and wherein each conversation of the conversations includes natural language inputs from the user and outputs from the LLM service associated with the respective node.

17. The method of claim 16, wherein the prompt includes contextual information, wherein the contextual information includes a portion of spreadsheet data from the spreadsheet.

18. The method of claim 17, wherein the multiple capabilities include a data analytics engine, and wherein the prompt further directs the LLM service to generate a query for input to the data analytics engine based on the natural language input.

19. The method of claim 17, wherein the multiple capabilities include creating a data table based on the spreadsheet data, and wherein the prompt further directs the LLM service to identify table columns.

20. The method of claim 17, wherein the multiple capabilities include creating a chart based on the spreadsheet data, and wherein the prompt further directs the LLM service to identify a type of the chart and columns in the spreadsheet to be visualized by the chart.

* * * * *